Figure 1:
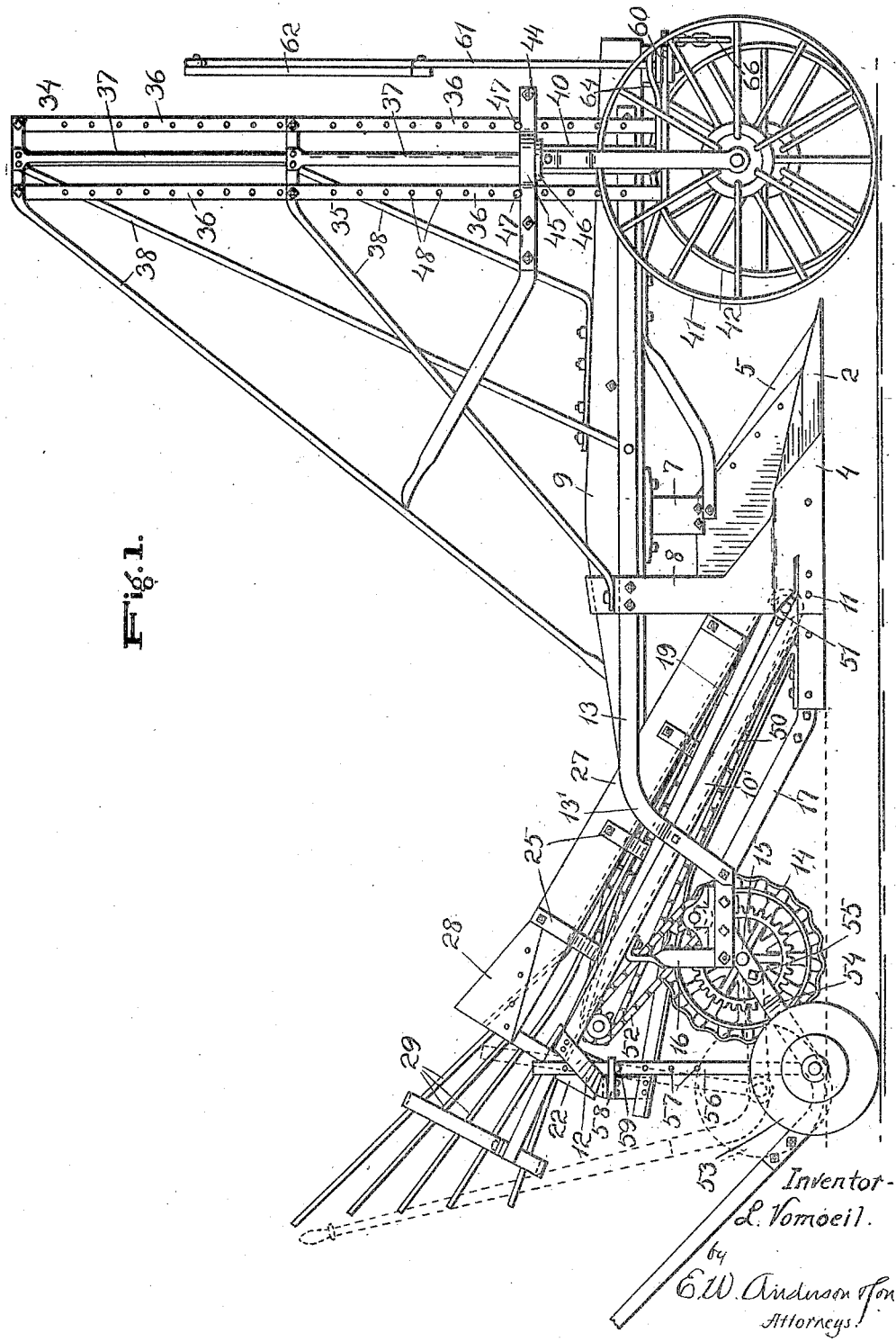

L. VOMOEIL.
TRENCH PLOW.
APPLICATION FILED APR. 29, 1918.

1,291,294.

Patented Jan. 14, 1919.
3 SHEETS—SHEET 1.

Inventor
L. Vomoeil
by
E. W. Anderson Son
Attorneys

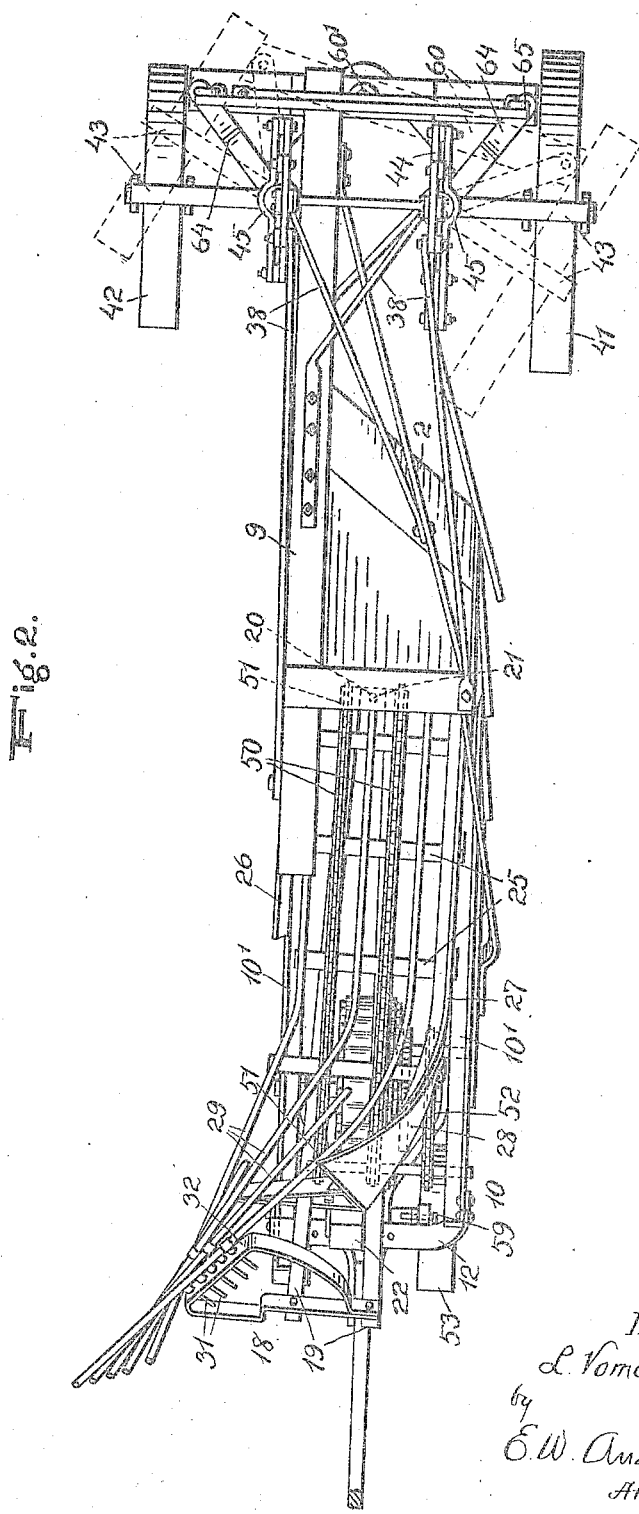

L. VOMOEIL.
TRENCH PLOW.
APPLICATION FILED APR. 29, 1918.
1,291,294.
Patented Jan. 14, 1919.
3 SHEETS—SHEET 3.
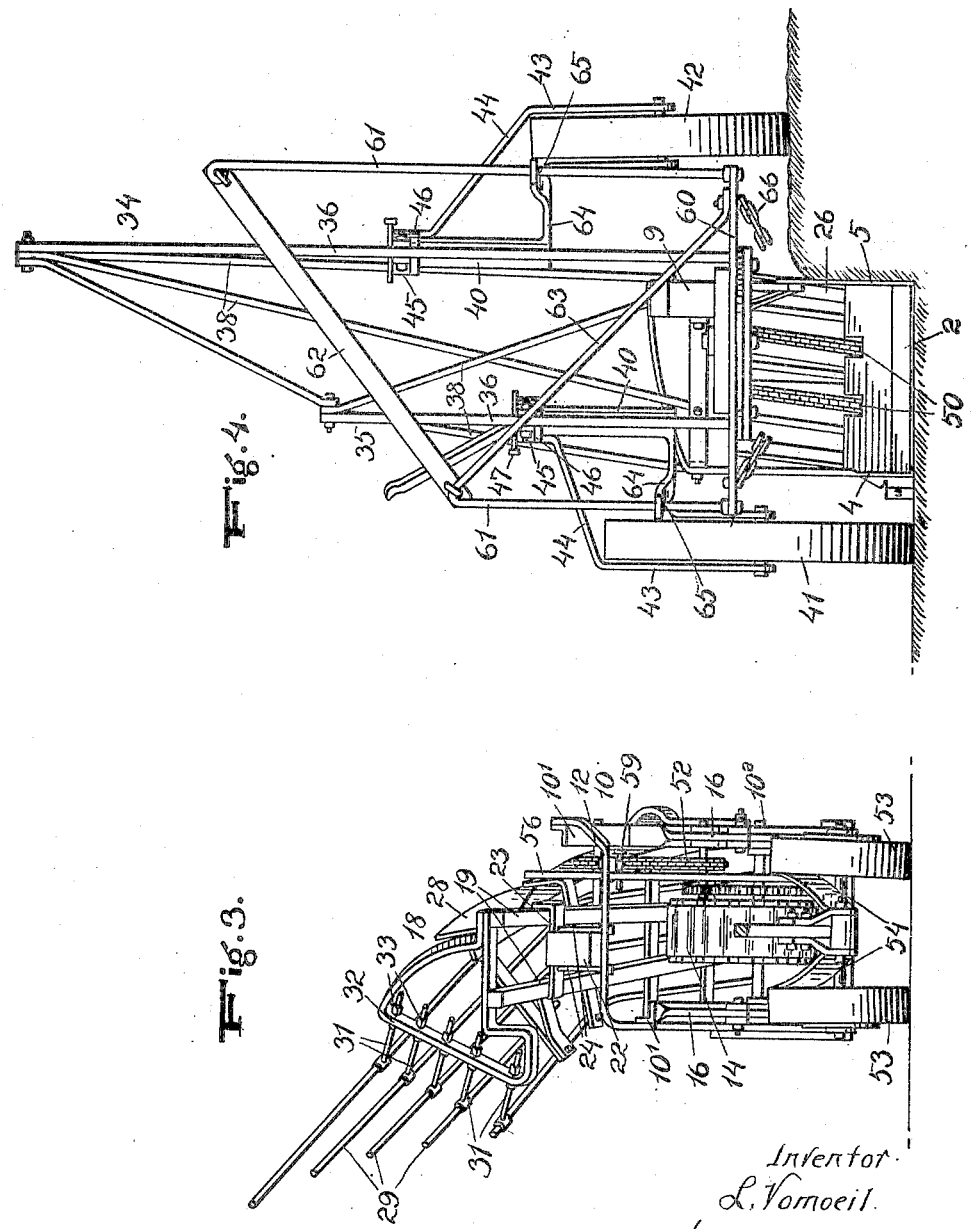
Inventor
L. Vomoeil.
by
E. W. Anderson & Son
Attorneys

UNITED STATES PATENT OFFICE.

LADISLAV VOMOEIL, OF BARD, CALIFORNIA.

TRENCH-PLOW.

1,291,294.

Specification of Letters Patent. Patented Jan. 14, 1919.

Application filed April 29, 1918. Serial No. 231,522.

*To all whom it may concern:*

Be it known that I, LADISLAV VOMOEIL, a citizen of the United States, resident of Bard and State of California, have made a certain new and useful Invention in Trench-Plows; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention.
Fig. 2 is a plan view of the same.
Fig. 3 is a front end view of the same.
Fig. 4 is a rear end view of the same.

The invention has relation to machines for cutting ditches or trenches, and it consists in the novel construction and combinations of parts, as hereinafter set forth.

In the accompanying drawings, illustrating the invention, the numeral 2 designates the share, on the order of the ordinary plow share, but inclined upwardly and rearwardly throughout its transverse extent and at both ends or sides thereof, namely at the landside and at the opposite side, upright cutters or flanges 4 and 5 being provided, one at the landside of the share and the other at the opposite side thereof. The plow is provided with a landside post 7 and an opposite post 8, said posts secured at their upper ends to the plow beam 9, from which the share is suspended.

Extending rearwardly of the share is a frame 10, having longitudinal angle-bars 10', connected rigidly at their forward ends to the share at 11 and at their rear ends connected by a transverse bar 12. These angle-bars are supported and braced intermediately of their lengths by longitudinal bars 13, located at the sides of the plow beam and extending downwardly in rear, at 13'.

A tractor wheel 14, from which the frame 10 and the plow beam and plow share are supported in rear, has its axle, 10², journaled in bearings of the frame 10, through the medium of bars 15 of said frame. Brace rods and extensions of the frame 10 are shown at 16 and 17.

A pivotal frame 18 includes longitudinal bars 19, connected at their forward ends at 20, an oblique pivot bolt 21 connecting said frame at its forward end with the rear frame of the plow share, so that the frame 18 as a whole may swing laterally to either side upon said pivot bolt. The frame 18 is supported in rear upon a block 22, resting upon the transverse bar 12, a rear transverse bar 23 of said frame resting upon said block. Uprights bolts 24, at each side of said block, connect the bar 12 with the bar 23, threaded nuts upon said bolts allowing vertical adjustment of the frame 18, the block being of wedge form or being substituted by another block of different height. In the lateral adjustment of the frame 18, the bolts 24 will engage other perforations or holes of the transverse bar 12, which is provided with a series of such holes. The longitudinal bars 19 are provided with other transverse brace bars 25.

Resting upon and secured to the transverse bars of the frame 18, at the landside and in rear of the share and of the cutter flange 5, is provided an upwardly and rearwardly inclined guide 26, usually of L form in cross-section and having upright and horizontal flanges, and at the opposite side and in rear of the cutter flange 4 is provided an upwardly and rearwardly inclined similar guide 27, extending in rear and longer than the guide 26 and extending also laterally at 28, at its rear end portion, in curved fashion toward and projecting over the landside of the ditch or trench.

Secured upon the transverse bars of the frame 18, and intermediate of the guides 26, 27, are mold board rods 29, spaced apart from and substantially parallel to each other and to the guide 27 and extending upwardly and rearwardly and also laterally, being at their rear portions curved toward and over the landside of the trench. These mold board rods are laterally yieldable in rear of bar 23 by spring movement thereof to either side, to project more or less over the landside of the trench, this lateral adjustment being usually accomplished by means of oblique support rods 31, having at their lower ends engagement with holes of an oblique transverse bar 32, said bar carried at the rear of the longitudinal frame bars 19 and said rods having suitable nuts 33, whereby the adjustment may be effected.

The plow beam is provided at each side thereof with upright frames 34 and 35, of similar character but one higher than the other, each frame consisting of parallel bars 36, spaced apart from each other, and a rod 37, located centrally of said bars and parallel thereto, suitable inclined braces to the plow beam being provided at 38. The rod 37 at one side of the plow beam, and relating to the higher of the frames, 34, is also higher than the rod at the opposite side, and working vertically upon each rod 37 is a sleeve 40.

The plow beam is supported forwardly upon wheels 41 and 42, one at each side thereof, each wheel provided with forks 43, extended inwardly at 44 and connected at their inner ends to the top and bottom of the respective sleeve 40.

An adjusting lever is provided for raising and lowering the plow beam and plow, to vary the depth of cut of the share and for transportation, said lever having at one end branched portions 44', embracing the lower of the upright frames, and a laterally spread portion 45 intermediate of the length of said branched portions and resting upon the laterally spread head 46 of the sleeve 40 at this side, said lever being engaged at each side of said head by pins 47, engaging horizontally alined holes 48 of the parallel bars of the frame 35. The parallel bars of this frame 35 are provided with a vertical series of these holes 48, wherein said pins are vertically adjustable.

In the adjustment, the lever is rocked upon said head as a fulcrum bearing, the branched portion of the lever taking a bearing at one side thereof against the pin 47 at this side, and thereby raising the lower upright frame and therewith the plow beam and plow share, the opposite side of said branched portion being at the same time depressed, to expose thereabove the hole 48 next lower in the parallel bar at said side, the pin 47 at the lowered side being then removed from its hole in said bar and reinserted in the hole so exposed. Upon reversely rocking the lever the opposite parallel bar, the plow beam and the parts connected thereto are raised by the pin engagement and a hole next lower in the first named parallel bar exposed, the pin in this bar being then removed and reinserted in the hole so exposed. In this way, step by step, the forward portion of the machine will be adjusted upwardly with relation to the wheel at this side. The upright frame at the opposite side is raised also by operation of the lever as stated, the pins of this frame being removed from their holes and reinserted at the required lower levels.

Between the inclined moldboard rods are located endless belts or chains 50, parallel and similarly inclined to the said rods and serving to assist in raising the dirt cut by the share, preliminary to throwing the same upon the landside of the trench, and serving also, through rearwardly directed pressure, to assist in such throwing. These chains are carried by end sprockets 51, and suitable driving connections 52 are provided with the tractor wheel.

In order to raise the tractor wheel and share from the ground in transporting the machine from place to place, transporting wheels 53 are carried by angle-lever frames 54, fulcrumed at 55 to the rear frame of the machine, the axle of the transporting wheels having pivoted thereupon at its lower end an upright rod 56, said rod provided with a vertical series of holes 57, engaged respectively by a pin 59, said pin bearing against a member 58, secured to transverse rod 12, to hold the rod 56 and the transporting wheels in position against upward movement when they take the weight of the machine at the rear.

An upright steering frame consists of a lower horizontal bar 60, pivoted centrally thereof at 60' to the forward portion of the plow beam and having at its ends vertical rods 61, said rods rigidly connected at their upper ends by an inclined bar 62, an inclined brace being shown at 63. Each sleeve 40 is provided at its lower end with a forwardly and outwardly extending horizontal bar 64, having at its outer end a perforation 65 engaged by the vertical rod 61 at this side. Steering chains 66 are connected to the outer ends of the lower bar 60 of the steering frame, and tension exerted upon one or the other of said chains will serve to swing said lower bar pivotally to one side or the other, and thereby to swing the sleeves and with them the wheels 41, 42 laterally in parallel fashion.

The invention is useful in cleaning old trenches as well as in cutting new trenches, and will effectually clear the former of Bermuda and other coarse grass or vegetation.

I claim:

1. In a trenching plow, a share, vertical cutters at each side of the share, upwardly, rearwardly and laterally inclined moldboard members adapted to throw the dirt upon the surface of the ground at the landside of the ditch, and upwardly and rearwardly inclined guides at the sides of said members, one of said guides being longer than the other and having a lateral inclination.

2. In a trenching plow, a share, vertical cutters at each side of the share, upwardly, rearwardly and laterally inclined moldboard members adapted to throw the dirt upon the surface of the ground at the landside of the ditch, and elevator devices operating between said moldboard members.

3. In a trenching plow, a share, vertical cutters at each side of the share, upwardly, rearwardly and laterally inclined moldboard members adapted to throw the dirt upon the surface of the ground at the landside of the ditch, endless elevator devices operating between said members, forward and rear carrying wheels, and means for adjusting the machine vertically upon said wheels.

4. In a trenching plow, a share, vertical cutters at each side, a rear frame pivoted at its forward end to the rear of the share frame, upwardly and rearwardly inclined guides carried by the pivotal frame, one of said guides longer than the other and inclined also laterally toward the landside, said frame capable of pivotal adjustment to provide for a greater or less throw.

5. In a trenching plow, a share, vertical cutters at each side, a rear frame pivoted at its forward end to the rear of the share frame, upwardly and rearwardly inclined guides carried by the pivotal frame, one of said guides longer than the other and inclined also laterally toward the landside, said frame capable of pivotal adjustment to provide for a greater or less throw, moldboard members carried by the pivotal frame and spaced apart from each other, and elevating chains located between said members.

6. In a trenching plow, a share, vertical cutters at each side, a rear frame pivoted at its forward end to the rear of the share frame, upwardly and rearwardly inclined guides carried by the pivotal frame, one of said guides longer than the other and inclined also laterally toward the landside, said frame capable of pivotal adjustment to provide for a greater or less throw, moldboard members carried by the pivotal frame and spaced apart from each other, said moldboard members laterally yieldable at their rear end portions, and means for individual lateral adjustment of said members.

7. In a trenching plow, a forward carrying wheel at each side, an upright frame carried by the plow beam at each side thereof, a sleeve working vertically upon each said frame, each said wheel having inwardly extending forks connected to the respective sleeve, and means for fixing said sleeve in vertically adjusted position.

8. In a trenching plow, a forward carrying wheel, an upright frame carried by the plow beam and having upright bars spaced apart and provided each with a vertical series of perforations, and a rod central of said bars, a sleeve working vertically upon said rod, said wheel having supporting connection with said sleeve, and an adjusting lever having a rocking bearing upon the upper end of the sleeve and engaging pins inserted in the perforations of said bars.

9. In a trenching plow, a share, vertical cutters at each side, a rear frame pivoted at its forward end to the rear of the share frame, upwardly and rearwardly inclined guides carried by the pivotal frame, one of said guides longer than the other and inclined also laterally toward the landside, said frame capable of pivotal adjustment to provide for a greater or less throw, moldboard members carried by the pivotal frame and spaced apart from each other, elevating chains located between said members, and a rear tractor wheel, said elevating chains having driving connections with said tractor wheel.

10. In a trenching plow, a share, vertical cutters at each side, a rear frame pivoted at its forward end to the rear of the share frame, upwardly and rearwardly inclined guides carried by the pivotal frame, one of said guides longer than the other and inclined also laterally toward the landside, said frame capable of pivotal adjustment to provide for a greater or less throw, moldboard members carried by the pivotal frame and spaced apart from each other, elevating chains located between said members, a rear tractor wheel, said elevating chains having driving connections with said tractor wheel, and means for raising said tractor wheel from the ground, consisting of levers pivoted to the rear frame of the machine and carrying transporting wheels, the axle of said wheels having an upright rod pivoted thereto and provided with a vertical series of perforations, and a holding pin having engagement with any one of said perforations and bearing against said rear frame.

11. In a trenching plow, an upright steering frame consisting of a horizontal bar carried by the forward end of the plow beam, vertical rods connected at the lower ends to the ends of said bar and having suitable bracing connections, frames carried by the plow beam at each side thereof, a sleeve pivoted upon each said frame, forks carried by said sleeves and wheels mounted in said forks, said sleeves having outwardly and forwardly extending bars provided at their outer ends with perforations engaging said vertical rods, and draft connections with the outer ends of said horizontal bar.

In testimony whereof I affix my signature in presence of two witnesses.

LADISLAV VOMOEIL.

Witnesses:
 ROY HANSBERGER,
 W. E. DONNINGTON.

Copies of this patent may be obtained for five cents each, by addressing the "Commissioner of Patents, Washington, D. C."